J. E. BOSS.
PROCESS OF CONDITIONING FOOD FORMING SUBSTANCES.
APPLICATION FILED MAR. 5, 1914.
1,185,622.   Patented June 6, 1916.
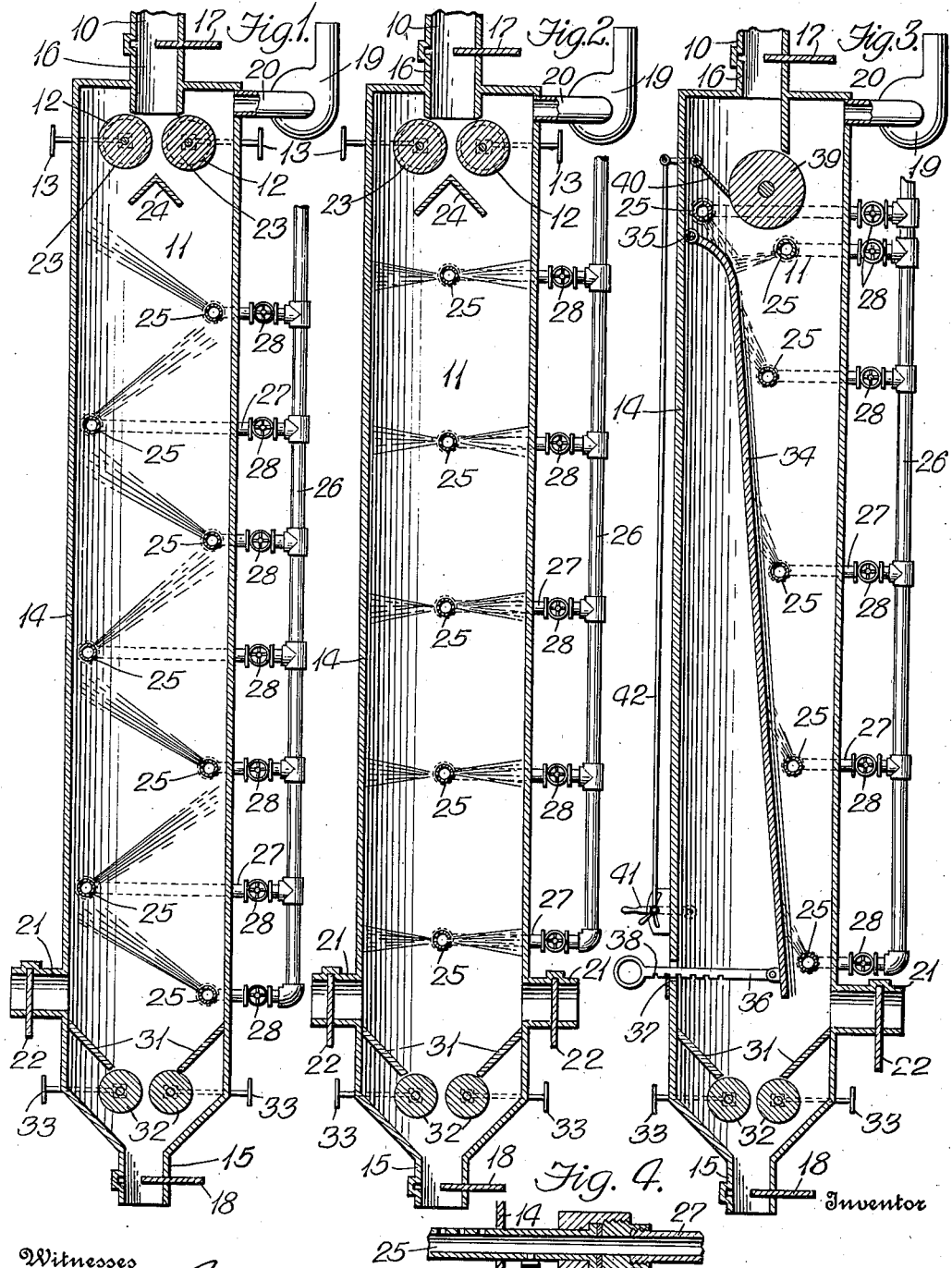
Witnesses
O. W. Pickering
Chas. W. Stauffiger
Inventor
Joseph Edward Boss;
By Henry S. Blackmore
Attorney

UNITED STATES PATENT OFFICE.

JOSEPH EDWARD BOSS, OF TORONTO, ONTARIO, CANADA.

PROCESS OF CONDITIONING FOOD-FORMING SUBSTANCES.

1,185,622. Specification of Letters Patent. Patented June 6, 1916.

Application filed March 5, 1914. Serial No. 822,787.

*To all whom it may concern:*

Be it known that I, JOSEPH EDWARD BOSS, a citizen of the United States, residing at Toronto, in the Province of Ontario, Dominion of Canada, have invented certain new and useful Improvements in Processes of Conditioning Food-Forming Substances, of which the following is a specification.

This invention relates to a process of treating food-forming products of cereal nature, and has for some of its objects the treatment of grain, such as wheat, rye, corn, barley, oats, rice, or other starch-bearing cereals or products thereof, in such a manner that the material is hydroscopically conditioned by either adding to or taking from the same, moisture or water, so that it may be uniformly hydrous in its character, and particularly for the purpose of finally disintegrating the grain cells or disrupting the same, whereby the product is rendered more susceptible to absorb moisture when supplied to it, and a larger increase in volume of bread-yielding product may be obtained than with products of similar nature produced heretofore. The material thus conditioned or in which the hydrous nature has been unified to a condition selective to disruption or disintegrating and disintegration of the cells by subjection to pressure between rolls, is thereafter subjected to the action of such applied pressure.

The product of this process, which comprises a food-producing material of cellular disrupted nature, is more thoroughly digested in given quantities in shorter time and with greater nutritive and body-building effect, and with longer keeping and moisture-retaining properties, requiring less yeast to produce greater leavening effect and also less sugar and shortening in working up the product into foods than the usual grit, meal, or flour.

In the prior art it has been customary to hydrate the grain by the action of water or steam to a degree that the swelling will burst the grain cells, then dry, grind, bolt and flour the product, also to reduce the grain to a grit, meal, or flour, and expose the grit, meal or flour to the action of water in the form of moisture, or steam, and then dry and flour or re-flour the product, also to saturate the grain with moisture and subject the grain thus saturated to the action of applied pressure sufficient to disrupt or disintegrate the grain cells through the combined inward action of applied pressure and outward action of internal fluid or moisture in its attempt to escape from or between the cellular structure or the cells proper of the grain.

The methods employed in the prior art to supply moisture to the grain or its segregated product, as heretofore employed, have been to subject the material to be hydrated to the action of moisture or water, preferably in the form of steam, while being conveyed through a hydrating chamber on a moving belt, or by allowing the material to fall in an unobstructed shower, by gravity, through a chamber to which moisture is supplied.

One of the principal objects of the present process is to supply moisture to or abstract it from the cellular material, to be segregated in such a manner that it is uniformly conditioned as to its moisture content, and comprises subjecting the material to the action of moisture or dehydrating influences while mechanically suspended in a gaseous or vaporous fluid for such a time as the desired condition of hydration is secured, by the combined action of a body of fluid traveling in a direction counter or at an angle to a shower of the traveling mass of material to be treated either against gravity directly or augmented by frictional conditions induced by the interception of angular baffles such as would be induced by an inclined plane, capable of retarding the action of gravity on the particles of falling material to be treated.

As an example of the process, the hydrous conditioning or hydrating of wheat flour or wheat grain will be taken, reference being directed to the accompanying drawing which diagrammatically illustrates the various steps and means for carrying out the same.

Referring to the drawings; Figure 1, represents a diagrammatic view of an apparatus whereby the grain conditioning is induced by the angular staggering resistance of the conditioning fluid intercepting the downward flow of the material to be conditioned, thereby retarding its travel until suitably treated; Fig. 2, shows a modification of the apparatus in which the conditioning of the material is induced by retarding zones or blankets of angularly disposed conditioning fluid; Fig. 3, shows an apparatus in further modified form whereby the fall of the material to be conditioned is intercepted by frictional resistance of an inclined plane against which impinges a current of conditioning fluid; and Fig. 4, shows a means whereby the conduit through which the conditioning fluid is introduced into the apparatus may be adjusted so that the direction of the fluid discharged into the apparatus may be controlled.

Similar numerals of reference represent corresponding parts in the various views.

In the illustration the numeral 10 represents a feed conduit communicating with the chamber 11, which is provided at its upper end with the adjustable crushing or feed rolls, 12, coacting with the adjusting device or member 13; the said rolls 12 being provided with means for heating or cooling 23.

The apparatus, including its various members, is suitably inclosed in the walls or housing 14, having the outlet 15.

The inlet 16, from the feed conduit 10, is provided with means, such as a slide valve or gate 17, for controlling or regulating the supply of grain or other materials to be treated, and the outlet 15 is provided with means, such as slide valve 18, for controlling the discharge of treated material from the apparatus, and also for regulating the inflow of air which may be occasioned through the action of the suction fan 19, communicating with the chamber 11, through the conduit 20.

The chamber 11 is provided with the air inlet 21, controlled by the slide valve 22. The upper part of chamber 11, below the feed rolls 12, is provided with an angular device 24 for diverting the downward flow of the material supplied to the apparatus. Arranged at each side of the chamber 11 are the fluid inlets 25, communicating with the supply conduit 26, through the inlet pipes 27, controlled by valves 28, whereby the conditioning fluid may be injected into the chamber 11 at suitable angles to the downward flow through the chamber 11 of the material to be treated, by gravity, in such a manner that its travel in a downward direction is interrupted and the material maintained in a partially suspended condition until upon reaching the lower part of the chamber it will have been sufficiently hydrated or dehydrated to produce the product desired, the angle of supply of the conditioning current of fluid being regulated and adjusted by rotatably moving the perforated supply inlets 25, by means of the handle 29, as shown in Fig. 4. The inlet 25 is rotatably situated in the coupling or stuffing box 30 communicating with the inlet 27.

The lower part of the chamber 11 is provided with the angular deflectors 31, whereby the treated material is diverted and conveyed to the crushing rolls 32, communicating with the adjusting devices 33, by which means the material is finally crushed or floured and the cells of the material disintegrated or disrupted.

The falling of the material through the conditioning chamber 11 is retarded and maintained in an obstructed or suspended condition in contact with the conditioning fluid by the current of such fluid supplied at an angle thereto or augmented by a reverse counter-current against gravity occasioned by an augmenting upward current of air induced and actuated by the rotary fan 19, the current of air being controlled by the slide valve 22, which can be regulated in such a manner with reference to the suction of fan 19 as to perform the conditioning of the material in the chamber 11 under decreased atmospheric pressure when so desired.

In Fig. 1, is shown the apparatus as arranged for the treatment or conditioning of material by angular obstruction to the downward flow of material by the injection of the conditioning fluid at various angles across its downward path, and in an upward direction. In Fig. 2, the conditioning fluid is supplied at right angles and in opposite directions from the center across the path of the descending material to be conditioned, thereby providing cross zones of conditioning fluid through which the falling material passes and by which it is retarded and held in suspension by the current of injected fluid until it has been suitably treated. In Fig. 3, is shown a modified means for obstructing or retarding the downward flow of material to be treated through chamber 11, by means of an adjustable inclined plane 34, against which impinges the current of conditioning fluid. The inclined plane is hinged or movable on the supporting device 35, and adjustable as to angle by the device 36, being suitably secured at any desired angular position by means of the locking device 37, coöperating with the ratchets 38. The upper part of chamber 11, as shown in Fig. 3, is provided with the feed roll 39. The supply of material is controlled by the pivoted device 40, coacting with the feed rolls 39, and is adjustable by the control device 41, actuated by the rod 42.

As an example of the conditioning of grain, such as the hydrating of the grain, reference is directed to Fig. 3, which illustrates a preferred form of apparatus for grain treatment. The grain supplied through conduit 10, and its flow is controlled by opening the slide valve 17, prior to which a current of steam is introduced into chamber 11, by opening the valves 28, which causes the steam to travel through the inlet pipe 27, and be discharged through the perforated adjustable supply device 25.

This supply device having been arranged so that the incoming steam will impinge at an upward angle on the inclined plane or frictional gravity resister or traveling path for the grain 34, and then the inclined plane having been suitably adjusted and fixed by the device 36, air is gradually withdrawn from the chamber 11, by causing the exhaust fan 19 to operate, and the slide valve 22 is slightly opened to cause a gradual upward flow of air. The rotary feed roll 39 is then revolved, the rod 42 is raised and secured by the device 41, thereby releasing the contact of the feed device 40 from direct contact with the feed roll, whereby the grain will fall upon the inclined plane 34, and be intercepted in its downward flow by the impinging upon it of the various jets of steam in its downward progress, and the grain is thereby retained until it is suitably saturated with moisture, at which time it is discharged into or between the crushing rolls 32, from which it is discharged through the outlet 15, controlled by valve 18 into a similar device, where it is treated with dry air in order to dehydrate the disrupted grain cells before grinding and bolting the same in the making of flour.

In cases where flour is treated directly for the further disintegration and disruption of the cells, the apparatus as shown in Fig. 1 and Fig. 2 is preferable, for the reason that the flour can be maintained in a suspended condition until it is thoroughly hydrated by the baffling and counter-current action of the hydrating fluids. Then the hydrated flour is crushed by passing it through the rolls, and the flour thus treated further dried by passing it through similar apparatus in which dry air is substituted for the steam or hydrating fluid in the first instance.

It will be noted that this process comprises the hydrating or dehydrating of substances, such as grain, or grain products, or substances of cereal or food-forming nature, by introducing and abstracting moisture into and from the cells thereof, through the baffling or retarding action of the conditioning fluid against or with the flow of the same, whereby it is freely suspended or maintained in contact with the conditioning fluid against gravity a sufficient time to accomplish the desired result before passing into a finished product.

It will be noted that in the process involved in the conditioning or tempering of food-forming products, such as grain or flour, the material to be conditioned or tempered is suspended against normal gravity and is isolated or independent increments or particles, by a current of fluid bearing or capable of absorbing moisture, and that the particles under treatment in this manner are converted or transformed to the character desired, either by increasing their weight by supplying moisture, or decreasing their weight by abstracting the same in shorter time and with more positive and controlled effect by reason of the fact that each particle is surrounded by the conditioning fluid and larger surfaces are thereby exposed to the action thereof.

It is obvious that the process may be carried out by the employment of a plurality or series of apparatus of either or any or all of the characters or forms illustrated, and that the conditioning fluid may be of any selective variety or kind for either the adding to or abstracting from the material to be acted upon of substances, such as moisture, in which case grain or flour may be increased in weight by adding moisture thereto in a first apparatus, the product thereof compressed by passing through rolls, thereby disrupting the hydrated cellular substance, such as grain or flour, and disintegrating the particles or cells thereof, and this disintegrated or cellular disrupted material then passed into a second apparatus where the conditioning fluid is of a character which will absorb moisture from the cellular disrupted material and dry the same, from whence this dried cellular disrupted material may be passed into and through grinding, bolting and flouring devices, whereby the material is transformed into a food-forming product of flour nature having a superior food-forming and yielding character.

The term, "conditioning" employed herein, is intended to imply and does imply a step in the process, including a fluid capable of delivering or withdrawing moisture or other substance to or from the material to be acted upon, such as grain, flour, etc., and involves and includes the process of swelling or shrinking, or wetting or drying the same, as the case may be.

While the process is particularly adaptable for supplying moisture or water to grain or food-forming products, it is not limited thereto, as it may be applied in a reverse manner for drying the product when desired, and both operations may be performed successively in a plurality of communicating apparatus or performed in the same apparatus with proper regulation of the conditioning fluid and supply of material, in order to obtain the result desired without departing from the spirit of the invention.

Some of the dominating features of the present process and means for carrying it out and accomplishing the result, and produce the product of superior nature over that of processes and apparatus devised hitherto, resides in the fact that the conditioning of the grain or other material is accomplished in a more perfect and uniform manner in shorter time by treating it while falling and freely suspended in a fluid vehicle and maintained therein until properly conditioned, or until the material has taken on or given up water or other substances to a desired degree, which is accomplished by action of the baffling currents of fluid intercepting the falling material, preferably at an angle to the falling line and from a plurality of directions, whereby the material is held up or suspended in a manner admitting of a treatment uniformly of its entire surface without obstruction or interference of any secondary resting support, such as shelves or solid baffles, which interfere with exposing the whole surface of the material, to simultaneous and uniform action. The treatment of the material maintained in a suspended and floating, or in a retarded free falling condition, in a fluid vehicle, with conditioning materials, is also augmented in its action by the revolving or rotary movement of the floating settling separated particles or ingredients which exposes all sides and surfaces equally to the conditioning action, resulting in a more perfect conversion in shorter time and with more uniform and positive results. The direction of the fluid suspending baffles may also be changed or adjusted and the speed or course of the current regulated to meet the necessities or exigencies of any particular case whereby its utility may be secured to the greatest degree and advantages obtained in the production of the product desired.

The treatment of the grain in conditioning thereof by passing a fluid vehicle in which the grain or substance to be conditioned is suspended, in an upward direction against the downward travel of the material to be conditioned, or in other words in directions opposite to each other, provides a superior means of exposing the material to conditioning action over that depending upon the carrying of the material to be conditioned in the same direction with and by the velocity of the fluid conveyer.

Having now described my invention, what I claim as new, and desire to secure by Letters Patent, is:—

1. The process of conditioning food forming substances, which comprises buoying said substance by a moving fluid while falling therethrough, subjecting the same to the action of a fluid capable of changing the hydrous character of the material, and maintaining the sustaining action between the point of supply and point of discharge until the material is properly tempered or conditioned.

2. The process of conditioning food forming substances, which comprises buoying said substance by a moving inert fluid while falling therethrough, subjecting the same to the action of a fluid capable of changing the hydrous character of the material, and maintaining the sustaining action between the point of supply and point of discharge until the material is properly tempered or conditioned.

3. The process of conditioning food forming substances, which comprises buoying said substance by moving air while falling therethrough, subjecting the same to the action of a fluid capable of changing the hydrous character of the material, and maintaining the sustaining action between the point of supply and point of discharge until the material is properly tempered or conditioned.

4. The process of conditioning food forming substances, which comprises buoying said substance by a moving fluid by falling therethrough, subjecting the same to the action of a moisture carrying vehicle capable of changing the hydrous character of the material, and maintaining the sustaining action between the point of supply and point of discharge until the material is properly tempered or conditioned.

5. The process of conditioning food forming substances, which comprises buoying said substance by a moving inert moisture carrying vehicle while falling therethrough, subjecting the same to the action of a fluid capable of changing the hydrous character of the material, and maintaining the sustaining action between the point of supply and point of discharge until the material is properly tempered or conditioned.

6. The process of conditioning food forming substances, which comprises buoying said substance by moving air while falling therethrough, subjecting the same to the action of a moisture carrying vehicle capable of changing the hydrous character of the material, and maintaining the sustaining action between the point of supply and point of discharge until the material is properly tempered or conditioned.

7. The process of conditioning food forming substances, which comprises buoying said substance by a moving fluid while falling therethrough, subjecting the same to the action of a water carrying vehicle capable of changing the hydrous character of the material, and maintaining the sustaining action between the point of supply and point of discharge until the material is properly tempered or conditioned.

8. The process of conditioning food forming substances, which comprises buoying said substance by a moving inert water carrying vehicle while falling therethrough, subjecting the same to the action of a fluid capable of changing the hydrous character of the material, and maintaining the sustaining action between the point of supply and point of discharge until the material is properly tempered or conditioned.

9. The process of conditioning food forming substances, which comprises buoying said substance by moving air while falling therethrough, subjecting the same to the action of a water carrying vehicle capable of changing the hydrous character of the material, and maintaining the sustaining action between the point of supply and point of discharge until the material is properly tempered or conditioned.

10. The process of conditioning food forming substances, which comprises buoying said substance by a moving fluid while falling therethrough, subjecting the same to the action of steam, and maintaining the sustaining action between the point of supply and point of discharge until the material is properly tempered or conditioned.

11. The process of conditioning food forming substances, which comprises buoying said substance by a moving inert fluid while falling therethrough, subjecting the same to the action of steam, and maintaining the sustaining action between the point of supply and point of discharge until the material is properly tempered or conditioned.

12. The process of conditioning food forming substances, which comprises buoying said substance by moving air while falling therethrough, subjecting the same to the action of steam, and maintaining the sustaining action between the point of supply and point of discharge until the material is properly tempered or conditioned.

In testimony whereof I affix my signature in the presence of two witnesses.

JOSEPH EDWARD BOSS. [L. S.]

Witnesses:
 THOMAS E. BOYD,
 HENRY W. WELTY.